…

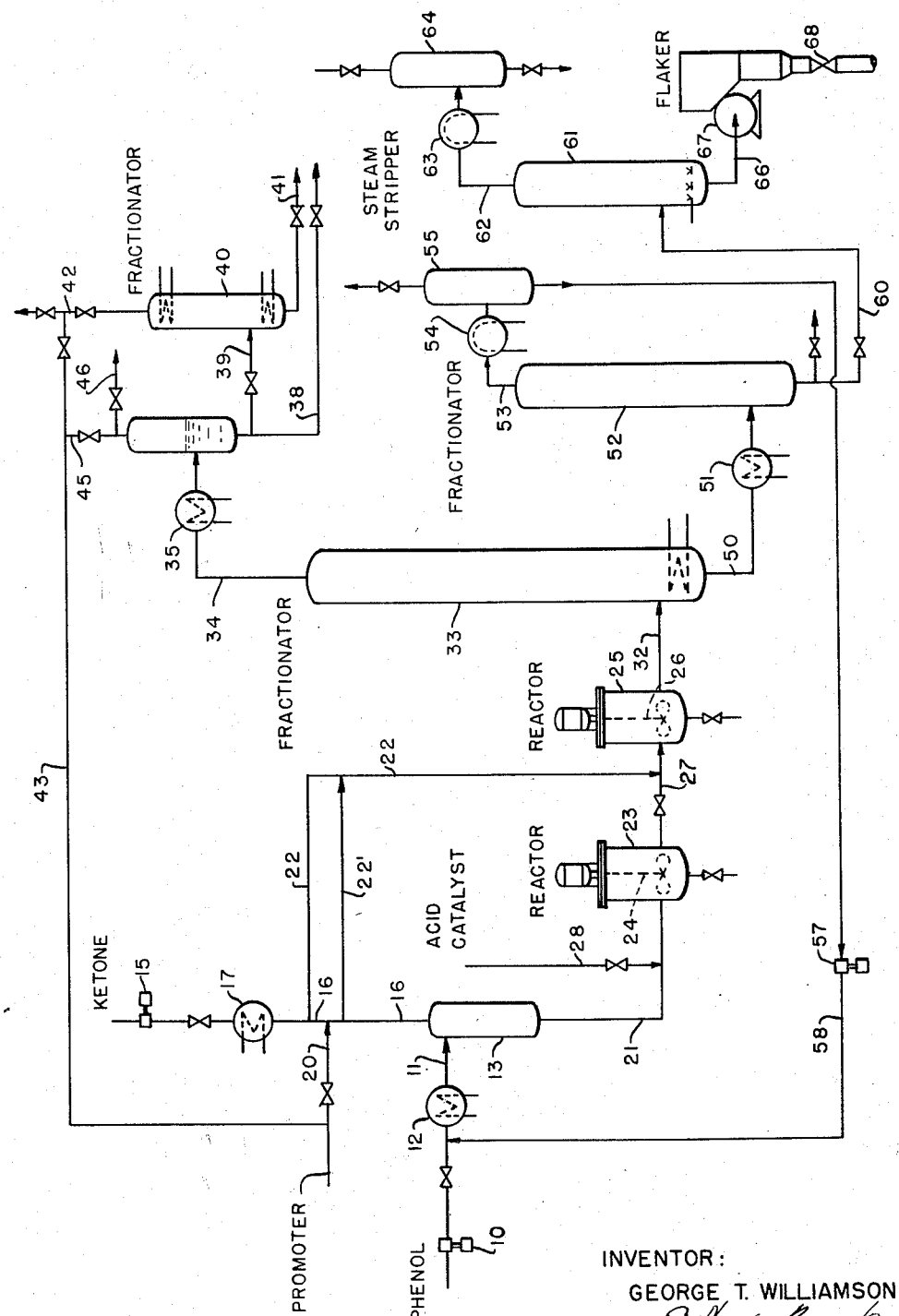

United States Patent Office 2,775,620
Patented Dec. 25, 1956

2,775,620

PRODUCTION OF BIS(HYDROXYARYL) SUBSTITUTED COMPOUNDS

George T. Williamson, Oakland, Calif., assignor to Shell Development Company, New York, N. Y., a corporation of Delaware Application July 12, 1954, Serial No. 442,770

11 Claims. (Cl. 260—619)

This invention relates to the production of bis(hydroxyaryl) compounds and relates more particularly to the production of hydroxyphenyl-substituted alkanes wherein the nuclei of two phenolic radicals are directly attached to a single carbon atom in the alkyl group. A particular aspect of the invention relates to the production of gem di-(hydroxyphenyl) propane.

Hydroxyphenyl-substituted compounds, such as, for example, bis(hydroxyphenyl) alkanes, are employed as starting and intermediate materials in the production of a wide variety of organic products. Methods for their production comprise the condensation of a phenolic compound with a carbonyl compound, for example, a ketone, in the presence of an acid condensation catalyst. Processes disclosed heretofore directed to the production of the desired bis(hydroxyaryl) compounds are generally limited to batch-type of operations wherein serious disadvantages, including the production of by-products to an inordinate degree as well as substantial product disintegration, are unavoidably encountered as a result of the conditions prevailing therein. The complex nature of the reaction mixtures encountered throughout the course of the operation, their sensitivity to relatively slight changes in operating conditions, and the inability to predict the effect of even minor changes in operating conditions upon either chemical or physical characteristics of the complex mixtures involved, renders exceedingly difficult the obtaining of a product of even a minimum degree of purity in the batch-type processes disclosed heretofore. The application to such methods of continuous operation, essential to efficient large-scale production of the desired compounds at a reasonable cost, is, therefore, generally impractical. The ability to use the bis(hydroxyaryl) compounds in many fields of application, particularly in the field of resin manufacture, is, however, often dependent upon their purity and the cost of their production in such a relatively pure state.

In co-pending applications Serial Nos. 306,171, now abandoned and 306,173, now U. S. Patent 2,730,553 issued January 10, 1956, both filed August 25, 1952, of which this application is a continuation-in-part, there are disclosed and claimed processes enabling the production of the desired bis(hydroxyaryl) compounds, such as the bis(hydroxyphenyl) alkanes, with a substantially improved degree of purity. The processes disclosed and claimed in said co-pending applications furthermore, for the first time, enable the efficient production of the desired bis(hydroxyphenyl) alkanes of improved purity in a continuous operation. Essential to the obtaining of products of a high degree of purity in continuous operation as disclosed in said co-pending applications is the use of a relatively high mole ratio of phenol to the carbonyl reactant. Though the methods of said co-pending applications now enable the production of the desired bis(hydroxyaryl) compounds with substantially improved purity, a relatively high degree of purity is often not attained without the use of inordinately high ratios of phenol to ketone. The handling of such relatively large quantities of phenol in the system of necessity entails an increase in cost of initial installation as well as operation. Applicant has found that an increase in the temperature of execution of the condensation reaction, particularly at the initial stages thereof, necessitates the use of a substantially greater amount of the phenol reactant to give a given degree of purity and that, therefore, it is advantageous to carry out at least the greater part of the process steps at relatively low temperatures. However, the lowest temperature which can be employed in an efficient operation, whether batch or continuous, is generally defined by the temperature at which substantial crystallization of the reaction mixture takes place. Under conditions at which substantial crystallization takes place, handling of the reaction mixture and removal of heat of reaction therefrom, present serious problems. The crude reaction mixture obtained in the acid-catalyzed condensation of phenol with dimethyl ketone, employing a ratio of phenol to the ketone of 10:1, will begin to crystallize at about 63° C., thereby rendering the execution of the process at relatively low temperatures difficult in the absence of further modifications of the operating conditions.

It is an object of the present invention to provide an improved process enabling the more efficient production of bis(hydroxyaryl) compounds.

Another object of the invention is the provision of an improved process enabling the more efficient production of bis(hydroxyphenyl) alkanes of high purity.

A further object of the invention is the provision of an improved process enabling the more efficient production of bis(hydroxyphenyl) alkanes of a high degree of purity by the acid-catalyzed condensation of a phenol with a ketone at a relatively low temperature in a continuous operation.

A specific object of the invention is the provision of an improved process enabling the more efficient production in continuous operation of gem(hydroxyphenyl) propane by the acid-catalyzed condensation of phenol with dimethyl ketone. Other objects and advantages of the present invention will become apparent from the following detailed description thereof made with reference to the attached drawing forming a part of the present specification wherein the single figure represents a more or less diagrammatical elevational view of one form of apparatus suitable for carrying out the process of the invention.

In accordance with the present invention, substantial improvement in the production of bis(hydroxyphenyl) alkanes by the acid-catalyzed condensation of a phenol with a carbonylic compound, such as an aliphatic ketone, are obtained by effecting the reaction of a temperature of from about 20° to about 110° C., with a ratio of said phenol to said carbonylic compound of at least 5:1 in the presence of an acid catalyst, in a plurality of successive stages, each of said stages receiving at least a substantial part of the reaction mixture obtained in the preceding stage, and wherein all of said phenol charge to the system, but only a part of the carbonylic compound charged to the system, is introduced into the first stage and the remainder of the carbonylic compound charged to the system is introduced into at least one subsequent stage.

In the preferred embodiment of the invention the process is carried out in continuous operation by effecting the reaction of a phenol with a carbonylic compound such as, for example, an aliphatic ketone, at a temperature of about 20 to about 110° C., and a total mole ratio of said phenol to the carbonylic component of at least 5:1, in the presence of an acid catalyst, in a plurality of reaction zones arranged in series flow, wherein a mixture, comprising all of the phenol charged to the system, the acid catalyst, and only a part of the total amount of carbonylic compound charged to the system, is introduced into the first reaction zone, the remainder of said carbonylic component of the total charge being introduced into at least one of the reaction zones positioned subsequent to the first reaction zone in said series.

In a preferred method of carrying out the process of the invention a temperature gradient increasing progressively in the direction of flow of reactants is maintained through said plurality of successive stages or reaction zones in series flow.

Essential to the attaining of the objects of the invention is the maintenance of a mole ratio of phenolic component to carbonylic component in the total charge to the system of at least 5:1, and the introduction of all the phenolic component but only a part, preferably a substantial part, of the ketone into the first stage, or reaction zone, of the process. The specific ratio of phenolic component to carbonylic component in the total charge to the process of the invention preferably maintained may vary considerably in accordance with specific operating conditions, nature of the specific charge materials employed and the degree of purity of the product desired. Ratios of phenolic component to carbonylic component in the total feed to the process up to, for example, about 15:1 are generally found suitable. Higher ratios of the phenolic component to the carbonylic component up to, for example, about 25:1 and higher are, however, contemplated within the scope of the invention.

The proportion of the total carbonylic charge to the process introduced into the first stage, or reaction zone, of the process may range, for example, from about 10 to about 90% by weight. Outside of this range the advantages of the invention are not attained. In general, it is preferred to introduce at least about 25 mole percent of the total carbonylic charge into the first stage, or reaction zone, of the process. Particularly preferred is the introduction of from about 50 to about 75% by weight of the total carbonyl charge to the system into the first reaction zone.

The acid-catalyzed condensation reaction of the invention is executed in the broad temperature range of from about 20 to about 110° C., and preferably in the range of from about 40 to about 85° C. It has been found that in the process of the invention the maintenance of the temperature in the second or a subsequent stage, or reaction zone, of the process in the higher range of the prescribed permissible temperature range can be resorted to without sacrificing to any substantial degree efficiency of operation or product purity. In the preferred method of carrying out the process of the invention a temperature gradient increasing progressively through the successive stages or zones of the process is therefore preferably employed. A temperature increasing progressively through said stages, or reaction zones, from about 20 to about 85° C., and preferably from about 45 to about 65° C., is found to be particularly advantageous. Particularly preferred is the maintenance of a temperature in the range of from about 20 to about 65° C. in the first stage, or reaction zone, of the process and in the range of from about 40 to about 85° C. in the second stage, or reaction zone, of the process; the temperature in the second stage, or reaction zone, being maintained above that in the first.

In the process of the invention the high ratio of phenolic component to carbonylic component in the first stage of the process enables the utilization of the lower temperature in the initial stage of the reaction, so vital to ultimate product purity without sacrifice of efficient continuous operation. The discovery that higher temperatures are tolerated in the second stage of the process, when carried out under the above-prescribed conditions, now makes possible the utilization of the higher temperatures in that phase of the process where the presence of an increased proportion of higher boiling components would render continuous operation far less efficient at lower temperatures. The use of such higher temperature in the second zone is made possible in the process of the invention while still maintaining a relatively low overall average temperature. The substantial advantages with regard to flexibility of operation, and consequent product purity, is evidenced by the following:

In a plurality of separate continuous operations identified by the designations runs "A, B, C, D, E and F," respectively, phenol is reacted with dimethyl ketone in a two-stage reactor system containing two reactors in series flow provided with stirrers and temperature controlling means. The phenol and dimethylketone are charged to the system in a total mole ratio of phenol to dimethylketone of 10:1. In all of the operations hydrogen chloride and methyl mercaptan in the amount of 6% and 1%, respectively, based on theoretical yield of 2,2-bis(4-hydroxyphenyl) propane, are introduced into the first of the two reactors in series. All of the phenol charge is introduced into the first reactor in each of the operations. In all operations all of the effluence from the first reactor passes into the second of the two reactors in series flow. The individual operations are carried out under substantially identical conditions with the exception that in "run A" all of the dimethylketone charge is introduced into the first reactor, that in runs B, C, D, E and F, the dimethylketone charge is proportioned between each of the two reactors in series, and that reactor temperatures are varied as governed by avoidance of substantial solid formation. Results which are obtained in such operations in terms of reactor temperatures, and consequent degree of product purity as determined by melting point and content of material soluble in paraffin hydrocarbon in percent by weight, are indicated in the following table. The time of contact was controlled in each operation to obtain a conversion of 90% of theoretical based upon the desired 2,2-bis(4-hydroxyphenyl) propane.

The values for content of material soluble in paraffinic hydrocarbons set forth in the present application indicate the percent by weight of the total bis(hydroxyphenyl) alkane sample which is dissolved in a paraffinic hydrocarbon solvent upon extraction of the bis(hydroxyphenyl) alkane sample in a Soxhlet extractor using a paraffinic

| Run | Proportion of Total Ketone Charge to 1st Reactor, Percent by Weight | Mole Ratio, Phenol to Ketone in Charge To— | | Temperature, ° C. | | | Product Purity | |
|---|---|---|---|---|---|---|---|---|
| | | 1st Reactor | 2nd Reactor | 1st Reactor | 2nd Reactor | Average | Melting Point, ° C. | Hydrocarbon Soluble Material, Percent Weight |
| A | 100 | 10:1 | | 60 | 62 | 61 | 153.2 | 5.5 |
| B | 90 | 11:1 | 80:1 | 55 | 62 | 59 | 153.8 | 4.5 |
| C | 75 | 13:3 | 34:1 | 52 | 62 | 57 | 154.2 | 3.8 |
| D | 50 | 20:1 | 18:1 | 50 | 62 | 56 | 154.3 | 3.6 |
| E | 25 | 40:1 | 12:7 | 48 | 62 | 55 | 153.3 | 4.0 |
| F | 10 | 100:1 | 11:1 | 42 | 62 | 52 | 153.2 | 5.5 | hydrocarbon such as, for example, normal hexane, as solvent.

Phenolic compounds reacted with carbonyl compounds to obtain the bis(hydroxyaryl) compounds in accordance with the invention comprise the broad class of phenolic compounds having at least one replaceable hydrogen atom directly attached to a nuclear carbon atom of the phenolic radical. By the term "phenolic compounds" as used herein and in the appended claims is meant those organic compounds containing an aromatic radical and one hydroxyl group, said hydroxyl group being linked directly to a carbon atom contained in the nucleus of an aromatic radical. The phenolic compounds, as a class, employed as starting material in the production of bis(hydroxyaryl) compounds in accordance with the invention comprise the simplest member of the class, phenol, and the homologues and substitution products of phenol containing at least one replaceable hydrogen atom directly attached to a nuclear carbon atom in the phenolic radical. Suitable phenolic compounds comprise those wherein hydrogen atoms of the aromatic phenolic nucleus have been substituted by hydrocarbon radicals, such as alkyl, cycloalkyl, aryl, alkaryl and aralkyl groups. Suitable phenolic compounds include among others the following: phenol, the cresols, the xylenols, thymol, carvacrol, cumenol, 2-methyl-6-ethylphenol, 2,4-dimethyl-3-ethylphenol, 4-ethylphenol, 2-ethyl-4-methylphenol, 2,3,6-tri-methylphenol, 2-methyl-4-tertiary-butylphenol, 2,4-ditertiary-butylphenol, 4-methyl-2-tertiary-butylphenol, 2-tertiary-butyl-4-methylphenol, 2,3,5,6-tetramethylphenols, 2,6-dimethylphenol, 2,6-ditertiary-butylphenol, 3,5-dimethylphenol, 3,5-diethylphenol, 2-methyl-3,5-diethylphenol, o-phenylphenol, p-phenylphenol, the naphthols, phenanthrol, their homologues and analogues. Suitable phenolic compounds comprise those containing more than one phenolic group in each nucleus as well as polynuclear compounds having one or more than one phenolic group in each nucleus. Mixtures of the above compounds may be used as the starting phenolic reactant. Mixtures of phenolic compounds such as found in commercial products, such as cresylic acid, e. g. petroleum cresylic acids and the like may serve as the phenolic starting material of the process within the scope of the invention.

Phenolic compounds leading to products of particular value in many fields of application comprise those having a total number of carbon atoms in the range of, for example, from 6 to about 20, and wherein individual substituent hydrocarbon groups contain from one to about 12 carbon atoms.

The class of carbonyl compounds reacted with a phenolic compound in the process of the invention is represented by the empirical formula:

wherein $R^1$ represents a member of the group consisting of any monovalent organic radical, aliphatic, cycloaliphatic, aromatic, heterocyclic, including hydrocarbon radicals such as alkyl, cycloalkyl, aryl, aralkyl, alkaryl, including saturated and unsaturated groups and $R^2$ represents a member of the group consisting of hydrogen and any monovalent organic radical, aliphatic, cycloaliphatic, aromatic, heterocyclic, including hydrocarbon radicals such as alkyl, cycloalkyl, aryl, aralkyl and alkaryl. The suitable carbonyl compounds comprise the ketones and aldehydes. Examples of such suitable ketones and aldehydes comprise dimethyl ketone, methyl ethyl ketone, diethyl ketone, dibutyl ketone, methyl isobutyl ketone, cyclohexanone, propionylphenone, methyl amyl ketone, mesityl oxide, cyclopentanone, acetophenone and acetaldehyde, propionaldehyde, butyraldehyde and benzaldehyde.

The specific carbonyl compound employed as starting material will depend upon the specific bis(hydroxyaryl) compound desired and may be governed to some extent by specific operation conditions employed. Particularly suitable compounds comprised in the above-defined class of carbonylic compounds comprise the aliphatic ketones and aldehydes having from three to fourteen carbon atoms to the molecule.

The reaction of the phenolic compound with the carbonyl compound in accordance with the invention is executed in the presence of an acid-catalyst such as, for example, a hydrogen halide such as hydrogen chloride, preferably in the anhydrous state. The use of the hydrogen chloride in amounts ranging from about 0.5% to about 20% by weight and preferably from about 3% to about 6% by weight based upon the yield of bis(hydroxyaryl) compound has been found satisfactory. Greater proportions of hydrogen chloride may, however, be employed within the scope of the invention. Maintenance of a desired concentration of hydrogen chloride in the reaction mixture may be controlled by the use of superatmospheric pressure and/or the use of an appropriate solvent.

Although hydrogen chloride is chosen as a preferred catalytic agent the process of the invention is in no wise limited to the use of only this active agent. Acidic agents comprising any strong mineral acid and acid-acting condensing agents such as, for example, sulfuric acid, hydrochloric acid, phosphoric acid, hydrobromic acid, hydrofluoric acid, nitric acid, dimethylsulfate, sulfur dioxide, p-toluene sulfonic acid, boron trifluoride, boron trifluoride complexes and other acid-acting compounds comprising compounds which are hydrolyzed by water to form acids such as aluminum chloride, sulfonyl chloride, phosgene, etc. Of the strong acids those having a dissociation constant greater than $10^{-3}$, and particularly the strong mineral acids are preferred.

The reaction is preferably executed in the presence of an added promoter for the acid-catalyzed reaction. Any of the promoters disclosed heretofore for the acid-catalyzed condensation of a phenol with a carbonyl compound may be employed within the scope of the invention. It is, however, preferred to employ as a promoter a normally gaseous material consisting essentially of methyl mercaptan. As disclosed and claimed in co-pending application, Serial No. 306,172, filed August 25, 1952, now U. S. Patent 2,730,552, issued January 10, 1956, methyl mercaptan is unique in its ability to promote the acid-catalyzed condensation of phenolic compounds with carbonyl compounds. It is distinguished in this regard from materials suggested heretofore as promoters for the reaction not only because of its ability to reduce to a surprising degree the time of contact, but because it enables such substantial reduction in contact time to be attained with the use of only a minimum amount of added promoter in the absence of any substantial amount of by-product formation or product disintegration. Such absence to any substantial degree of by-product formation and product disintegration aids in enabling the process to be carried out in a continuous method with the production of a reaction mixture from which the desired bis(hydroxyaryl) compound as well as charge components suitable for recycling are separated in a relatively high degree of purity with a minimum of operative steps.

The relatively small amounts of methyl mercaptan which need be employed to obtain substantial reduction of contact time and the ease with which this highly volatile compound is removed unaltered from the resulting reaction mixture contribute materially not only to avoidance of product contamination but to a reduction in cost of catalyst as well as overall operation.

The methyl mercaptan may be introduced into the system by solution in a portion, or all, of the carbonyl reactant to the process and/or by its direct introduction into the reaction zone. It may be introduced continuously or incrementally during the course of the operation. A particular advantage of the use of the methyl mercaptan resides in the ability to obtain surprisingly increased reaction rates with relatively small amounts of the methyl mercaptan, ranging, for example, from as little as 0.01% to about 0.5%. The optimum amount of methyl mercaptan to be employed will be governed to some extent by the particular reactants as well as specific operating conditions employed. Amounts of the methyl mercaptan ranging up to about 1% by weight based on the theoretical yield in the case of gem di-(hydroxyphenyl) propane production generally suffice to obtain an increase in reaction rate commensurate with continuous operation. Higher amounts may, however, be employed within the scope of the invention. Methyl mercaptan introduced into the reaction zone need not necessarily be in essentially pure state. Thus, methyl mercaptan may be introduced into the system in admixture with a normally gaseous carrying medium or diluent for example, an inert normally gaseous material such as a normally gaseous paraffinic hydrocarbon, nitrogen and the like. A particularly suitable methyl mercaptan promoter is the methyl mercaptan-containing fractions separated from mercaptan-containing hydrocarbon mixtures of natural petroleum origin. Although methyl mercaptan has been set forth above as the preferred promoter in the execution of the acid-catalyzed reaction in the process of the invention, it is to be pointed out that the invention is not limited to the use of this specific promoter. The use of other promoters in the process, for example, ionizable sulfur compounds, alkyl mercaptans such as ethyl mercaptan, thiophenols, mercapto-substituted aliphatic monocarboxylic acids and the like is comprised within the scope of the invention.

The use of solvents which are relatively inert under the conditions of execution of the reaction such as, for example, water-immiscible organic compounds, for example, aromatic hydrocarbons such as xylene, toluene, chlorinated hydrocarbons; or in the absence of such water-immiscible compounds the use of moderate amounts of water may be employed within the scope of the invention. It is to be pointed out, however, that a specific advantage of the process of the invention resides in efficient operation without the need of such added solvents or diluents.

The use of inert gaseous materials to aid in maintaining desired agitation of the reaction mixture within the reaction zone may be resorted to within the scope of the invention.

The time of contact may vary considerably within the scope of the invention. An advantage of the invention distinguishing the process from those disclosed heretofore resides in the relatively short contact times required to obtain high yield based on the reactants charged. Thus, contact times within a range of from about 15 minutes to about two hours will be found ample to obtain yields ranging up to at least 90% of the theoretical in the production of high purity 2,2-bis(4-hydroxyphenyl) propane using a mol ratio of phenol to dimethyl ketone of at least 5:1 in the presence of methyl mercaptan as the promoter for the acid-catalyzed reaction carried out in the plune stage process of the invention. Longer or shorter contact times may, however, be employed within the scope of the invention.

The desired bis(hydroxyaryl) compound and unconverted reactants such as phenol are separated from the reaction mixture. Unconverted reactants such as, for example, phenolic compounds are recycled to the first stage, or reaction zone of the process. Normally gaseous materials comprising, for example, normally gaseous promoter such as methyl mercaptan, if employed, as well as normally gaseous acid catalyst, are separated from reactor effluence and may be recycled in part or in entirety to the reaction. Suitable means comprising one or more such steps as, for example, stratification, distillation, solvent extraction, extractive distillation, adsorption, and the like may be resorted to in carrying out product separation.

Under the above-defined conditions the phenolic component and the carbonylic component of the charge to the process interact with the formation of a reaction mixture comprising bis(hydroxyphenyl) compounds. The bis(hydroxyphenyl) compounds obtained consist essentially of compounds wherein the nuclei of two phenolic radicals are directly attached by carbon-to-carbon linkage to the same single carbon atom in the alkyl group as represented by the following formula:

$$\text{HO—Ar—}\underset{\underset{R^2}{|}}{\overset{\overset{R^1}{|}}{C}}\text{—Ar'—OH} \quad \text{(II)}$$

wherein $R^1$ is a member of the group consisting of monovalent organic radicals including hydrocarbon radicals such as alkyl, cycloalkyl, aryl, alkaryl and aralkyl which may be saturated or unsaturated, and Ar-OH and Ar'-OH are phenolic radicals, and $R^2$ is a member of the group consisting of hydrogen and monovalent organic radicals including hydrocarbon radicals such as alkyl, cycloalkyl, aryl, alkaryl and aralkyl which may be saturated or unsaturated, and Ar-OH and Ar'-OH are phenolic radicals. In the bis(hydroxyaryl) alkanes represented by formula II the radicals $R^1$ and $R^2$ have the same significance as in the above-defined formula I representing the suitable carbonylic starting materials. The phenolic radicals Ar-OH and Ar'-OH in the above formula II will correspond to the phenolic radical obtained by the removal of hydrogen from a nuclear carbon atom of a phenolic component of the charge to the process. Hydroxyphenyl-substituted compounds, having a specifically desired composition and structure, are therefore obtained in accordance with the invention by the judicious selection of specific carboxylic and phenolic starting reactants. Thus, the interaction of unsubstituted phenol with an aliphatic ketone such as, for example, dimethylketone, will result in reaction products comprising gem (4-hydroxyphenyl) propane. The reaction products obtained will generally comprise isomeric forms of the bis(hydroxyaryl) compounds. Thus, the interaction of unsubstituted phenol with dimethyl ketone in accordance with the invention, the reaction products will comprise a mixture of bis(4-hydroxyphenyl) propane and bis(2-hydroxyphenyl) propane, in which the former will generally predominate.

In order to set forth more fully the nature of the invention as applied to the continuous production of the bis(hydroxyaryl) compounds it will be described in greater detail hereinbelow as applied to the production of a bis(hydroxyphenyl) compound such as, for example, gem di-(4-hydroxyphenyl) propane by the condensation of phenol with dimethly ketone with reference to the attached drawing.

Referring to the drawing a phenol, for example, phenol emanating from an outside source is forced by means of pump 10 through valve line 11 provided with preheater 12 into a suitable mixing zone. The mixing zone may comprise any suitable means such as, for example, chamber 13 enabling admixture of charge components to the system. A carbonyl compound such as, for example, dimethyl ketone, emanating from an outside source, is forced by means of pump 15 through valved line 16, provided with indirect heat exchanger 17, into chamber 13. A promoter, for example, a normally gaseous stream comprising methyl mercaptan is passed through valved line 20 into line 16. Within chamber 13 the phenol, dimethyl ketone and methyl mercaptan are admixed by passage of the charge components therethrough. From chamber 13 the mixed charge is passed through line 21 into a suitable reaction zone.

The reaction zone may comprise a plurality of suitable reactors, for example, reactors 23 and 25, connected in series, and provided with suitable means for maintaining the contents thereof in a state of agitation such as, for example, stirrers 24 and 26. Although but two reactors are shown in the drawing more than two such reactors arranged in series flow may be employed within the scope of the invention.

Phenol and dimethyl ketone are introduced into the system through lines 11 and 16 respectively, in a mol ratio of phenol to ketone of at least 5:1, and preferably at least 10:1. Only a part, for example, about 50 to about 75% by weight, of the dimethyl ketone so charged to the system is passed into mixing chamber 13. The stream leaving mixer 13 through line 21, comprising all of the phenol charge to the system, is introduced into reactor 23, that is the first of the two reactors in series. The portion of the dimethyl ketone charged to the system through line 16 which is not introduced into mixer 13 is by-passed through valved line 22 into transfer line 27 discharging into reactor 25, the second of the two reactors in series flow.

An acid catalyst such as, for example, hydrogen chloride is passed through valved line 28 into line 21 entering reactor 23. Addition of the acid catalyst to the charge preferably is made immediately prior to entrance of the mixed charge into reactor 23. Since in the presence of the methyl mercaptan promoter the reactor will be initiated substantially immediately upon contact with the acid catalyst the presence of the acid catalyst in any substantial portion of the equipment preceding the reactor is preferably avoided. A part or all of the acid catalyst may be introduced as a separate stream directly into reactor 23. Hydrogen chloride introduction is controlled to maintain its concentration in the reactor 23 in the range of about 1% to about 12%, and preferably from about 3% to about 6%, by weight based on theoretical product yield.

The methyl mercaptan promoter is introduced in controlled amounts to maintain its concentration in the reactor in the range of from about 0.25% to about 1.0% based on theoretical yield of 2,2-bis(p-hydroxyphenyl) propane. A valved line 22 is provided to enable the passage of promoter to reactor 25 should this be desired.

The total effluence from reactor 23 is passed through valved line 27 into the second reactor, 25. The temperature within reactors 23 and 25 is maintained in the range of from about 20° C. to about 110° C. and preferably from about 40° C. to about 85° C. In a preferred method of carrying out the invention the temperature in reactor 23 is maintained in the range of from about 20 to about 65° C. and that in reactor 25 is maintained above that in reactor 23 in the range of from about 45 to about 85° C. Under the above-identified conditions phenol and dimethyl ketone react within reactors 23 and 25 with the formation of reaction products comprising bis di(hydroxyphenyl) propane consisting essentially of 2,2-bis(4-hydroxyphenyl) propane.

The residence time in each reactor may vary considerably within the scope of the invention depending to some extent upon the specific materials charged and conditions employed. The residence time in the first reactor is generally such that a conversion to the desired 2,2-bis(4-phenylhydroxy) propane of at least 80%, and preferably at least 90%, of theoretical is achieved in the first reactor based on the charge thereto. The residence time in the second reactor is preferably sufficiently long to obtain a total overall conversion of at least 90% of theoretical. In general, an overall time of residence within the combined reactors 23 and 25 in the range of from about ¼ to about 2 hours, and preferably from about ½ to about 2 hours is satisfactory. Under these conditions of maintenance of the reactants within reactor 23 for a time of from about 5 minutes to about 60 minutes, and preferably from about 15 minutes to about 45 minutes, and the remainder of the above-indicated overall time in reactor 25 is satisfactory. Longer or shorter residence time within either reactor may be used, however, within the scope of the invention. Conditions within reactors 23 and 25 are controlled to maintain at least a substantial portion of the contents thereof in the liquid state.

A part or all of the effluence from the second reactor may optionally be passed into a suitable soaking zone and therein maintained at a temperature substantially in the range of that maintained in either of the reaction zones for a relatively short period of time, prior to passage to a separating zone. The soaking zone may comprise for example an elongated coil and/or a chamber.

Effluence from reactor 25 comprising bis di-(hydroxyphenyl) propane, unconverted phenol, hydrogen chloride and methyl mercaptan is preferably passed directly through valved line 32 into a separating zone comprising fractionator 33. Within fractionator 33 there is separated a vapor fraction comprising normally gaseous materials including methyl mercaptan, hydrogen chloride, water and some entrained phenol from a liquid fraction comprising bis(hydroxyphenyl) propane and phenol. The vapor fraction is taken overhead from fractionator 33 through line 34 provided with condenser 35, and introduced into an accumulator 36. In passing through condenser 35 at least a substantial part of the stream flowing through line 34 is condensed. Condensate comprising hydrogen chloride, water and entrained phenol is taken from accumulator 36 by means of valved line 38. A part or all of the condensate flowing through line 38 may be passed through a valved line 39 into a separating zone comprising a fractionator 40. Within fractionator 40 a normally gaseous fraction comprising methyl mercaptan and hydrogen chloride is separated from a liquid fraction comprising phenol, water and hydrogen chloride. The liquid fraction is withdrawn from fractionator 40 by means of valved line 41. Normally gaseous overhead from fractionator 40 is eliminated therefrom by means of valved line 42. A part, or all, of the normally gaseous stream comprising methyl mercaptan and hydrogen chloride flowing through valved line 42 may be passed through valved line 43 into line 20. Normally gaseous material comprising methyl mercaptan and hydrogen chloride may be passed directly from accumulator 36 through valved line 45 into line 43. A valved line 46 is provided for eliminating normally gaseous materials from the system.

The liquid fraction comprising phenol and bis(hydroxyphenyl) propane separated in fractionator 33 is passed therefrom through line 50 provided with suitable heating means such as, for example, heat exchanger 51 into a fractionating zone comprising fractionator 52. Within fractionator 52 there is separated a vapor fraction comprising phenol from a liquid fraction comprising bis(hydroxyphenyl) propane. The vapor fraction is passed from fractionator 52 through line 53 provided with condenser 54, into an accumulator 55. Condensate consisting essentially of phenol is forced from accumulator 55 by means of pump 57 through line 58 into line 11.

The liquid fraction separated in fractionator 52 is passed therefrom through valved line 60 into a stripping column 61. Within stripping column 61 the liquid fraction consisting essentially of bis(hydroxyphenyl) propane and traces of unconverted phenol is subjected to a steam stripping operation to strip the last traces of phenol out of the bis(hydroxyphenyl) propane. Overhead from column 61 consisting essentially of water and phenol is passed through line 62 provided with condenser 63 into an accumulator 64.

Bottoms from column 61 consisting essentially of liquefied bis-2,2-(4-hydroxyphenyl) propane is passed through line 66 to a flaker 67. High purity bis(hydroxyphenyl) propane consisting essentially of gem-2,2(4-hydroxyphenyl) propane is taken from flaker 67 by means of conduit 68 as a final product.

The following is illustrative, but not limitative, of the plural stage process of the invention:

2,2-bis(4-hydroxyphenyl) propane is produced by passing phenol and dimethylketone in a mol ratio of phenol to dimethyl ketone of 10:1 in continuous operation through a two stage reactor system. In the operation a continuous stream of admixed phenol, dimethyl ketone, hydrogen chloride and methyl mercaptan is introduced into the first of two reactors arranged in series flow. The reactors consist of chamber-type reactors, each equipped with a stirrer and means for maintaining the reaction temperature therein. The charge to the first reactor contains the total amount of the phenol and only one-half of the total amount of dimethylketone charged to the system. The mol ratio of phenol to dimethylketone in the mixture charged in continuous stream to the first reactor is therefore 20:1. Methyl mercaptan and the hydrogen chloride are present in the charge in amounts equal to about 1 percent and 6 percent, respectively (based on total theoretical yield of 2,2-bis(4-hydroxyphenyl) propane). Contents of the first reactor are maintained at 50° C. Effluence from the first reactor is passed continuously into the second of the two reactors in series. The proportion of the total dimethyl ketone charged to the system and not introduced into the first reactor is introduced into the second reactor. The contents of the second reactor are maintained at 62° C. The rate of feed through the reactors is controlled to maintain the residence time in the first reactor at about 15 minutes and in the second reactor about 30 minutes.

Effluence from the second reactor is subjected to a first distillation to separate water, hydrogen chloride and methyl mercaptan therefrom. Bottoms from the first distillation consisting essentially of 2,2-bis(4-hydroxyphenyl) propane and phenol, are subjected to a second distillation to separate phenol as overhead therefrom. Bottoms from the second distillation, consisting essentially of 2,2-bis(4-hydroxyphenyl) propane, are recovered as a final product. A yield of the desired 2,2-bis(4-hydroxyphenyl) propane of about 96% of theoretical is obtained having a melting point of 153.8° C. and a content of material soluble in paraffinic hydrocarbon of about 3.6% by weight. It is seen that the product of high purity is obtained in a two stage operation wherein the average reaction temperature is 56° C.

In a separate operation wherein phenol and dimethyl ketone are reacted in a mole ratio of 10:1 in a single reactor with a total residence time of 30 minutes and at a temperature of 65° C. the yield of the desired 2,2-bis(4-hydroxphenyl) propane is only about 87% of theoretical. The product obtained has a melting point of 152.8° C. and a content of material soluble in paraffinic hydrocarbon solvent of about 5.1% by weight.

I claim as my invention:

1. In a process for the production of 2,2-di-(hydroxyphenyl) propane wherein phenol is reacted with dimethyl ketone in the presence of an acid catalyst at a temperature of from about 20 to about 110° C. the steps which comprise charging said phenol and said dimethyl ketone in continuous stream in a mole ratio of phenol to dimethyl ketone of at least 10:1 and in the presence of said acid catalyst through a plurality of zones comprising a first reaction zone and a second reaction zone arranged in series flow and maintained at a temperature in said temperature range, introducing in constant stream a mixture comprising said acid catalyst and all of said phenol but only from about 50% to about 75% by weight of said dimethyl ketone into said first reaction zone, introducing the remainder of said dimethyl ketone in continuous stream into said second reaction zone, and maintaining a temperature gradient increasing progressively in the direction of flow of the reactants through said plurality of zones.

2. The process in accordance with claim 1 wherein said acid catalyst is hydrogen chloride.

3. The process in accordance with claim 2 wherein the temperature in said first reaction zone is maintained in the range of from about 20 to about 65° C., and said second reaction zone is maintained at a temperature in the range of from about 45 to about 85° C. which is higher than the temperature maintained in said first reaction zone.

4. In a process for the production of 2,2-di-(hydroxyphenyl) propane wherein phenol is reacted with dimethyl ketone in the presence of an acid catalyst consisting essentially of hydrogen chloride at a temperature of from about 20 to about 110° C., the steps which comprise charging said phenol and said dimethyl ketone in continuous stream in a mole ratio of phenol to dimethyl ketone of at least 5:1 and in the presence of said hydrogen chloride to a plurality of zones comprising a first reaction zone and a second reaction zone arranged in series flow and maintained at a temperature in said temperature range, introducing in constant stream a mixture comprising said hydrogen chloride and all of said phenol but only from about 25 to about 90% by weight of said dimethyl ketone into said first reaction zone, introducing the remainder of said dimethyl ketone in continuous stream into said second reaction zone, and maintaining a temperature gradient increasing progressively in the direction of flow of the reactants through said plurality of zones.

5. The process in accordance with claim 4 wherein the temperature in said first reaction zone is maintained in the range of from about 20 to about 65° C., and said second reaction zone is maintained at a temperature in the range of from about 45 to about 85° C. which is higher than the temperature maintained in said first reaction zone.

6. In a process for the production of bis(hydroxyphenyl) alkanes wherein phenol is reacted with an aliphatic ketone in the presence of a strong mineral acid at a temperature in the range of from about 20 to about 110° C., the steps which comprise charging said phenol and said aliphatic ketone in continuous stream in a mole ratio of phenol to said aliphatic ketone of at least 5:1 and in the presence of said acid catalyst through a plurality of reaction zones arranged in series flow and maintained at a temperature in said temperature range, introducing in constant stream a mixture comprising said acid catalyst and all of said phenol but only from about 25 to about 90% by weight of said aliphatic ketone into the first of said plurality of reaction zones, introducing the remainder of said aliphatic ketone in continuous stream into a reaction zone which is subsequent to said first reaction zone of said plurality of reaction zones, and maintaining a temperature gradient increasing progressively in the direction of flow of the reactants through said plurality of zones.

7. The process in accordance with claim 6 wherein said aliphatic ketone is dialkyl ketone.

8. The process in accordance with claim 6 wherein said acid catalyst is hydrogen chloride.

9. The process for the production of bis(hydroxyaryl) propane wherein a phenol having at least one replaceable hydrogen atom attached directly to a carbon atom in the phenolic ring is reacted with dimethyl ketone in the presence of a strong mineral acid catalyst at a temperature of from about 20 to about 110° C., the steps which comprise charging said phenol and said dimethyl ketone in continuous stream in a mole ratio of at least 5:1 and in the presence of said acid catalyst to a plurality of reaction zones arranged in series flow and maintained at a temperature in said temperature range, introducing in constant stream a mixture comprising said acid catalyst and all of said phenol but only from about 25 to about 90% by weight of said dimethyl ketone into the first reaction zone of said plurality of reaction zones, introducing the remainder of said dimethyl ketone in continuous stream into a reaction zone which is subsequent to said first reaction zone in said plurality of reaction zones in series flow, and maintaining a temperature gradient increasing progessively in the direction of flow of the reactants through said plurality of zones.

10. In a process for the production of bis(hydroxyaryl) alkanes wherein a phenol having at least one replaceable hydrogen atom attached directly to a carbon atom in the phenolic ring is reacted with an aliphatic ketone in the presence of an acid catalyst consisting essentially of a strong mineral acid at a temperature in the range of from about 20 to about 110° C., the steps which comprise charging said phenol and said aliphatic ketone in continuous stream in a mole ratio of phenol to said aliphatic ketone of at least 5:1 and in the presence of said acid catalyst through a plurality of reaction zones arranged in series flow and maintained at a temperature in said temperature range, introducing in constant stream a mixture comprising said acid catalyst and all of said phenol but only from about 10 to about 90% by weight of said aliphatic ketone into the first of said plurality of reaction zones, introducing the remainder of said aliphatic ketone in continuous stream into at least one reaction zone subsequent to said first reaction zone in said plurality of reaction zones, and maintaining a temperature gradient increasing progressively in the direction of flow of the reactants through said plurality of zones.

11. The process in accordance with claim 10 wherein said acid catalyst is hydrogen chloride.

References Cited in the file of this patent

UNITED STATES PATENTS

| | | |
|---|---|---|
| 2,468,982 | Jansen | May 3, 1949 |
| 2,623,908 | Stoesser et al. | Dec. 30, 1952 |
| 2,638,486 | Chiddix et al. | May. 12, 1953 |

OTHER REFERENCES

Faith: Jour. Amer. Chem. Soc., vol. 72 (1950), p. 837 (1 page).